April 21, 1964 G. CLARK 3,130,022
LIQUID RESERVOIRS FOR AIRCRAFT
Filed March 13, 1961

INVENTOR:
GEORGE CLARK

By: Stevens, Davis, Miller & Mosher
Attorneys

United States Patent Office 3,130,022
Patented Apr. 21, 1964

3,130,022
LIQUID RESERVOIRS FOR AIRCRAFT
George Clark, Morley, England, assignor to The English Electric Company, Limited, London, England, a British company
Filed Mar. 13, 1961, Ser. No. 95,235
Claims priority, application Great Britain Mar. 22, 1960
2 Claims. (Cl. 55—182)

The present invention relates to a liquid reservoir for aircraft capable of operating in all conditions met by aerobatics of the aircraft, for example to an oil reservoir suitable for use in conjunction with constant speed drives. Such a reservoir has to ensure continuous oil feed to the consumer and to achieve adequate de-aeration of the oil even when the system is subjected to zero or negative values of g.

According to the present invention, a separate plenum chamber having restricted passages on top and bottom for the bleeding of air and liquid is arranged within an outer shell. Liquid returning from the consumer such as oil in a constant speed drive enters tangentially into an inner vortex ring within a de-aeration chamber and the de-aerated liquid overflows the edges of this ring and emerges from said de-aeration chamber through ports into the said plenum chamber. Air is vented from the de-aeration chamber through a vent pipe, and de-aerated liquid is supplied to the consumer from the said plenum chamber through an outlet pipe for the liquid. Any liquid leaking from the plenum chamber through the said restricted passages into the outer shell is allowed to return to the de-aeration chamber through balance pipes, in any position of the reservoir.

Figure 1:
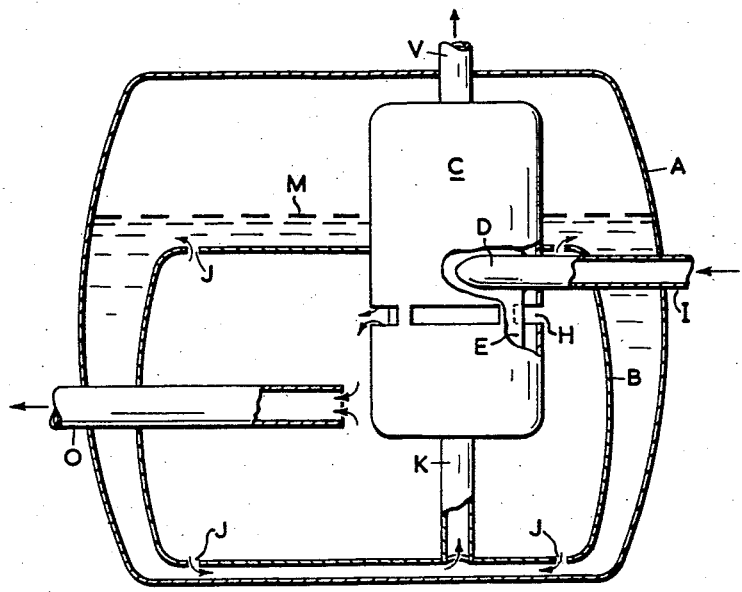
Figure 2:
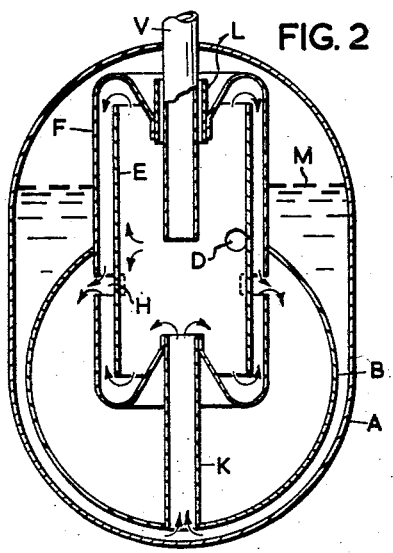
Figure 3:
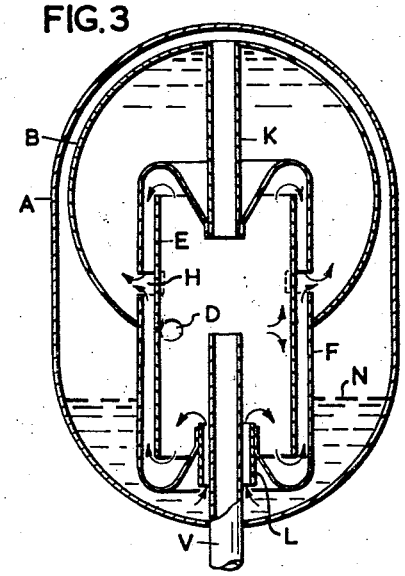

In order that the invention may be clearly understood, and readily carried into effect, an embodiment thereof will now be described by way of example with reference to the accompanying drawings, in which:

FIGURE 1 is a longitudinal section of an oil reservoir according to the invention in the upright position, FIGURE 2 is a section on the line II—II of FIGURE 1, and FIGURE 3 is a section corresponding to FIGURE 2, but in the inverted position of the reservoir.

The reservoir has an outer shell A composed of two part-cylindrical portions connected by straight walls, and a cylindrical plenum chamber B inside said shell, co-axial with the lower part-cylnidrical portion and offset from the axis of the upper part-cylindrical portion thereof.

A cylindrical de-aeration chamber C is positioned at right angles to the shell A and plenum chamber B, the chamber C being totally within said shell A and partly within said chamber B. This de-aeration chamber C has an outer cylindrical sleeve F and an inner cylindrical vortex ring E, annular port sections H being provided in said outer sleeve F for the efflux of de-aerated oil.

An oil inlet pipe I penetrates through the bottoms of the outer shell A and plenum chamber B from the right hand side of FIGURE 1, and issues tangentially in a nozzle D of the inner vortex ring E. The interior of the de-aeration chamber C (inside the ring E) is vented through a vent pipe V passing with ample clearance through a co-axial balance pipe L between the de-aeration chamber C and the outer shell A. Another co-axial balance pipe K connects the semi-annular reserve oil space between the shell A and plenum chamber B to the interior of the de-aeration chamber C within the inner vortex ring E. Restricted passages J are arranged on top and bottom of the plenum chamber B to serve as air and/or oil leaks.

An oil outlet pipe O penetrates through the bottoms of the outer shell A and the plenum chamber B in FIGURE 1 from the left handside. This outlet pipe O is connected in operation to the consumer, for example to a constant speed unit.

In normal operation oil enters eccentrically the inner vortex ring E through the inlet pipe I and nozzle D, forms a vortex on the inner wall face of the ring E and overflows on the upper and lower edges of the ring E into the annular space between said ring E and the outer sleeve F, the de-aerated oil leaving the latter through the ports H into the plenum chamber B. Air separated in the de-aeration chamber C from the oil is vented through the vent pipe V. Some de-aerated oil from the plenum chamber B leaks into the outer shell A through the restricted passages J, the main outflow of de-aerated oil taking place however through the oil outlet pipe O. A return flow of oil from the outer shell A to the interior of the de-aeration chamber C is possible through the balance pipe K. The flow of oil described is indicated in FIGURES 1 and 2 by little arrows. The plenum chamber B is asumed to be filled with oil, the outer shell has its level indicated at M, the de-aerator C contains oil with a paraboloid surface owing to the vortex action, the space above the oil surface therein being vented through the pipe V and communicating with the air space in the outer shell A through the balance pipe K.

The amount of oil pumped from the plenum chamber B through the outlet pipe O to the consumer is exactly balanced with the amount of oil returned to the said plenum chamber B via the de-aeration chamber C. However, leakage from the plenum chamber B through the said restricted passages J plus the oil pumped away through the outlet pipe O together exceed the amount of oil returned from the consumer through the inlet pipe I. The balance pipe K is therefore provided to enable the centrifugal action of the oil in the de-aerator C to be used for pumping oil from the space between the outer shell A and plenum chamber B into the interior of the de-aeration chamber and thus to establish a balance between oil outflow from and oil intake into said de-aerator chamber C.

In the inverted position (FIGURE 3) the tangential inflow from the inlet pipe I through the nozzle D into the interior of the inner vortex ring E and the overflow at the edges of the latter remain unaltered. The air separated from the oil escapes now from the de-aeration chamber C through the pipe K while the de-aerated oil passes through the ports H into the plenum chamber B which, as before, is assumed to be filled with oil. The greater part of the oil leaves through the outlet pipe O towards the consumer as in the position according to FIGURES 1 and 2. Some leakage of oil from the plenum chamber B occurs through the restricted passages J and accumulates in the outer shell A to a level N, excess oil being returned to the de-aeration chamber in this position through the balance pipe L. The oil flow is again indicated by little arrows.

Any residual air carried along by the oil into the plenum chamber B can escape through those restricted passages J which are actually on top, depending on whether the reservoir is in the position of FIGURES 1 and 2 or of FIGURE 3. This action can be sustained indefinitely while hitherto in the inverted position the gradual build-up of air in the plenum chamber put a limit to operation in the inverted position when the oil outlet pipe became uncovered and the oil feed out of the reservoir accordingly failed.

As the reservoir according to the invention is composed substantially of bodies of rotation its construction and assembly is simple and it proves resistant to vibrations and pulsating pressures.

What I claim as my invention and desire to secure by Letters Patent is:

1. A liquid reservoir for aircraft, comprising in combination; an outer shell, a plenum chamber wholly enclosed within and spaced from said outer shell, and having restricted passages on top and bottom for bleeding air and liquid from said plenum chamber into said surrounding outer shell, a de-aeration chamber arranged wholly within said outer shell and partly within said plenum chamber, a vortex ring arranged co-axially within said de-aeration chamber, an inlet pipe for liquid penetrating from outside through said outer shell, plenum chamber and de-aeration chamber and issuing tangentially into said vortex ring, said de-aeration chamber having ports in the middle communicating with said plenum chamber, an outlet pipe for the liquid penetrating from said plenum chamber outwardly through said outer shell, and a vent pipe penetrating from said de-aeration chamber outwardly through said outer shell, the liquid overflowing the edges of said vortex ring into said de-aeration chamber flowing from the latter through said ports into said plenum chamber and into said outlet pipe, and the air separated from said liquid emerging from said de-areation chamber through said vent pipe into the outer atmosphere.

2. A liquid reservoir as claimed in claim 1, comprising balance pipes connecting each end of said de-aeration chamber with said outer shell and allowing the return of liquid leaking from said plenum chamber through said restricted passages into said outer shell to return to said de-aeration chamber in any position of said reservoir.

References Cited in the file of this patent
UNITED STATES PATENTS
2,983,331    Helsley _____ May 9, 1961